United States Patent Office 3,098,017
Patented July 16, 1963

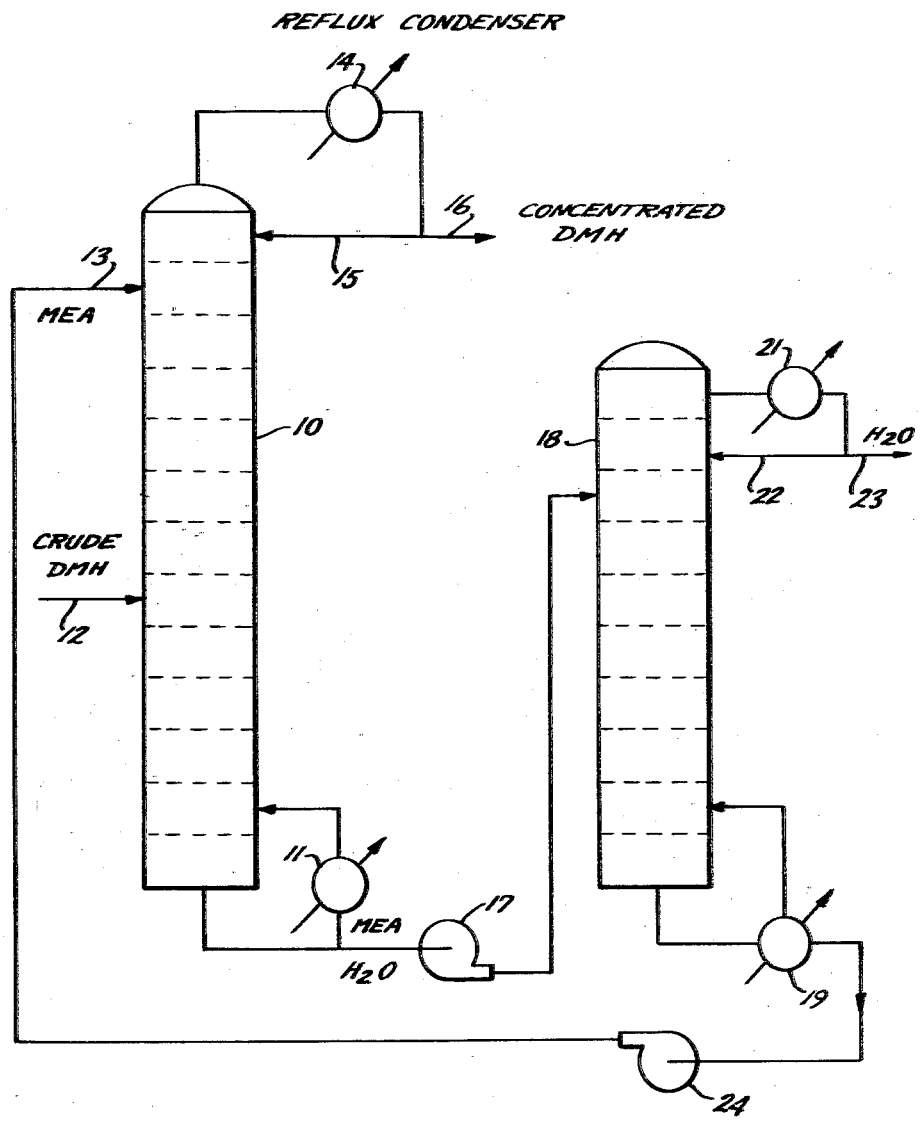

1

3,098,017
PROCESS OF SEPARATING UNSYMMETRICAL DIMETHYLHYDRAZINE FROM AQUEOUS SOLUTIONS CONTAINING SAME
Charles R. Walter, Jr., Hopewell, Va., and Billy E. Lloyd, Memphis, Tenn., assignors to Allied Chemical Corporation, New York, N.Y., a corporation of New York
Filed Oct. 12, 1959, Ser. No. 845,996
4 Claims. (Cl. 202—39.5)

This invention relates to the separation of unsymmetrical dimethylhydrazine (hereinafter referred to as DMH for the sake of brevity) from aqueous solutions containing DMH.

In this specification, all percentages are given on a weight basis.

DMH is used as a special fuel in the guided missile and rocket fields. It is made, for example, by reducing an aqueous solution of nitrosodimethylamine employing platinum, palladium, or other catalysts under superatmospheric pressure. There is thus produced an aqueous solution of DMH containing less than about 50% DMH, usually from 10% to 40% and small amounts of high boiling compounds.

Although the separation of DMH from water by distillation at atmospheric pressure is theoretically possible, it is not practically feasible due to the peculiar shape of the vapor-liquid equilibrium curve. The volatility of DMH at concentrations less than about 40% is only slightly greater than that of water, and vapors in equilibrium with the liquid are only slightly enriched in DMH. Consequently, an uneconomically large number of plates are necessary to achieve good separation between the DMH and the water.

It has been proposed to alter the vapor-liquid equilibrium relationship by carrying out the distillation of the aqueous DMH in the presence of 1% to 30% of sodium hydroxide (U.S. Patent 2,876,173) based on the amount of aqueous DMH. Such procedures are objectionable, among other reasons, because sodium hydroxide is corrosive to equipment and its handling presents a hazard to personnel.

It is a principal object of the present invention to provide a process of separating DMH from aqueous solutions by extractive distillation, which process is efficient, particularly in that it results in the economical recovery of substantially anhydrous DMH by a simple distillation in high yields as the overhead product which does not have to be separated from the extractive agent employed in the extractive distillation treatment. It is another object of the present invention to provide such process involving the use of an extractive agent which is non-corrosive to steel equipment.

Other objects and advantages of the present invention will be apparent from the following detailed description thereof.

In accordance with this invention, aqueous DMH is subjected to extractive distillation in the presence of monoethanolamine to produce overhead DMH substantially free of water and of the monoethanolamine and a bottoms stream containing the water and the monoethanolamine. This bottoms stream can be subjected to distillation or other separation treatment to effect separation of the monoethanolamine from the water. The monoethanolamine thus separated, preferably, is recycled to the distillation of the aqueous DMH to supply the monoethanolamine necessary to effect the separation.

We have found that the monoethanolamine is a surprisingly effective extractive agent for separating DMH from water by distillation in a column which preferably is operated under atmospheric pressure conditions. Its use results in high yields of substantially anhydrous DMH as an overhead product which does not have to be separated from the extractive agent. Surprisingly, it is much more effective for removal of water from aqueous DMH than other organic liquids including triethanolamine, aniline, isoamyl alcohol, isopropyl ether and benzonitrile.

Moreover monoethanolamine is non-corrosive to steel equipment and the handling thereof presents no unusual hazard to personnel.

Preferably the monoethanolamine is supplied to the distillation column in amount of from 0.5 to 3 volumes of monoethanolamine per volume of aqueous DMH. The reflux ratio employed in the column should be at least 10, desirably from 10 to 20, and preferably from 14 to 18.

The accompanying drawing is a flow sheet which shows for purposes exemplification a preferred arrangement of distillation equipment for practicing the process of the present invention.

In this drawing, 10 is a distillation column of any known type provided with a boiler 11 at its base; this boiler may, for example, be steam heated. At an intermediate point of the column, where the concentration of water vapor within the column is substantially the same as the water content of the crude DMH feed, a line 12 is provided for supplying the aqueous DMH feed which may contain, for example, from 10% to 40% DMH and from 90% to 60% water. Near the top of the column, a line 13 is provided for the supply of the monoethanolamine to the column. The top of the column communicates with a reflux condenser 14 from which the condensate is divided into two streams; one stream is returned through line 15 to column 10 to provide the reflux liquid for the column. The other stream is withdrawn through line 16 as the concentrated DMH product.

From the bottom of column 10, pump 17 continuously withdraws monoethanolamine-water mixture and pumps this mixture into an intermediate point of a distillation column 18. This column 18 is provided wtih a boiler 19 at its base and a reflux condenser 21 communicates with its top. Condensate from condenser 21 is divided into two streams, one of which is returned as reflux liquid through line 22. Water is removed through line 23 and may be passed to waste or otherwise disposed of.

From the base of distillation column 18, pump 24 continuously returns monoethanolamine through line 13 into the distillation column 10.

The following examples are given to illustrate preferred modes of practicing the process of the present invention. It will be understood that the invention is not limited to these examples.

The examples were carried out in a 25 bubble-cap Brunn column, equivalent to about 12 theoretical plates. The aqueous DMH continuously fed to this column was obtained by catalytic hydrogenation of N-nitrosodimethylamine and contained 16% DMH. This aqueous DMH solution was introduced at the 15th cap from the base of the column. The monoethanolamine was introduced at the 21st cap from the base of the column. The column was operated under atmospheric pressure conditions with the boiler maintaining the mixture at the base boiling (106° to 132° C. depending on the monoethanolamine-water composition) and provided with a constant level take-off for the monoethanolamine-water mixture.

The operating conditions and the results obtained are given in the table which follows:

| Example No. | Feed Ratio by Volume MEA/Aqueous DMH | Reflux Ratio | Percent Charged DHM Recovered Overhead | Product Analysis by Weight | |
|---|---|---|---|---|---|
| | | | | Percent DMH | Percent H₂O |
| 1 | 2:1 | 15/1 | 98 | 99.0 | less than 0.03. |
| 2 | 1:1 | 15/1 | 94 | 98.4 | 0.15. |
| 3 | 0.5:1 | 15/1 | 80 | 96.8 | 1.10. |
| 4 | 1:1 | 10/1 | 93.5 | 96.6 | 0.70. |

For purposes of comparison, in the same column aqueous DMH was distilled without added monoethanolamine, using a reflux ratio of 10 to 1. There was recovered 60% of the charge overhead containing 36% water and 62% DMH.

In the above examples, as well as in the comparative run, the aqueous DMH feed contained a small amount of methanol, methylamine and traces of other components, which account for the remaining small percentages in the product analysis above given.

It will be noted that the present invention provides a continuous extractive distillation process of separating DMH from aqueous solutions, which process results in the production of substantially anhydrous DMH containing less than about 1% and preferably less than 0.3% water and which is substantially free of the extractive agent. It will be further noted that the process of the present invention involves the use of monoethanolamine as the extractive agent; monoethanolamine is non-corrosive to steel equipment and presents none of the hazards involved in the handling of caustic soda.

Since certain changes may be made in carrying out the above described distillation method without departing from the scope of the invention, it is intended that all matter contained in the above description or shown in the accompanying drawing shall be interpreted as illustrative and not in a limting sense. Thus while it is preferred to operate under atmospheric pressure conditions, it will be appreciated that pressures somewhat above atmospheric, but not so high as to require expensive equipment designed to withstand high pressures, may be used without departing from this invention. Also, if desired, the distillation may be carried out under pressures below atmospheric, although it is preferred, as indicated, to operate under atmospheric pressure conditions for reasons of economy.

What is claimed is:

1. A process of separating unsymmetrical dimethylhydrazine from aqueous solutions containing unsymmetrical dimethylhydrazine which comprises extractively distilling the aqueous solution of unsymmetrical dimethylhydrazine in the presence of monoethanolamine and taking off overhead unsymmetrical dimethylhydrazine substantially free of water and of monoethanolamine, while removing as bottoms an aqueous solution of monoethanolamine.

2. The process as defined in claim 1, in which the extractive distillation is carried out employing from 0.5 to 3 volumes of monoethanolamine per volume of aqueous unsymmetrical dimethylhydrazine.

3. The process as defined in claim 1, in which the extractive distillation is carried out employing from 0.5 to 3 volumes of monoethanolamine per volume of aqueous unsymmetrical dimethylhydrazine and a reflux ratio of at least 10.

4. The process of separating unsymmetrical dimethylhydrazine from aqueous solutions containing from 10 to 40 weight percent unsymmetrical dimethylhydrazine and the rest chiefly water, which comprises continuously feeding the aqueous solution to an intermediate point of a distillation column; continuously introducing into the upper portion of said column monoethanolamine in amount of from 0.5 to 3 volumes of monoethanolamine per volume of aqueous unsymmetrical dimethylhydrazine introduced into said column; maintaining the liquid mixture in the base of said column at its boiling point; passing the resultant vapors upwardly through said column counter-current to the descending streams of liquid; continuously removing overhead the unsymmetrical dimethylhydrazine vapor substantially free of water and of monoethanolamine; condensing said vapors and returning a portion of the condensate as reflux liquid to maintain the reflux ratio within the range of from 10 to 20; continuously removing as bottoms an aqueous solution of monoethanolamine; continuously separating the monoethanolamine from water; and continuously feeding the monoethanolamine thus separated to said column to supply the monoethanolamine required to effect said extractive distillation of the aqueous unsymmetrical dimethylhydrazine fed to said column.

References Cited in the file of this patent
UNITED STATES PATENTS

| | | |
|---|---|---|
| 2,537,791 | Schwarcz | Jan. 9, 1951 |
| 2,785,052 | Osborg | Mar. 12, 1957 |
| 2,876,173 | Nicolaisen | Mar. 3, 1959 |
| 2,917,369 | Osborg | Dec. 15, 1959 |

OTHER REFERENCES

"Technique of Organic Chemistry," vol. IV, Weissbergee (page 348 relied upon) (N.Y. 1951).